United States Patent Office 3,060,824
Patented Oct. 30, 1962

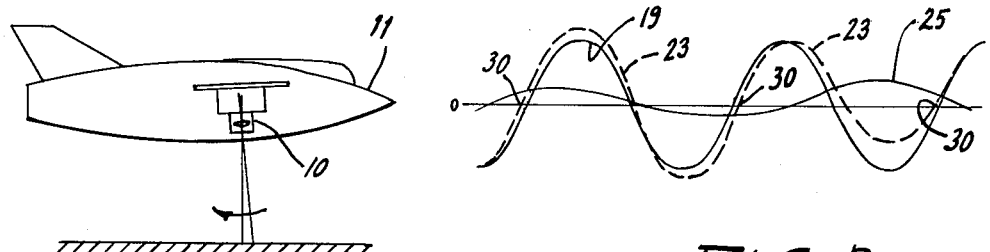
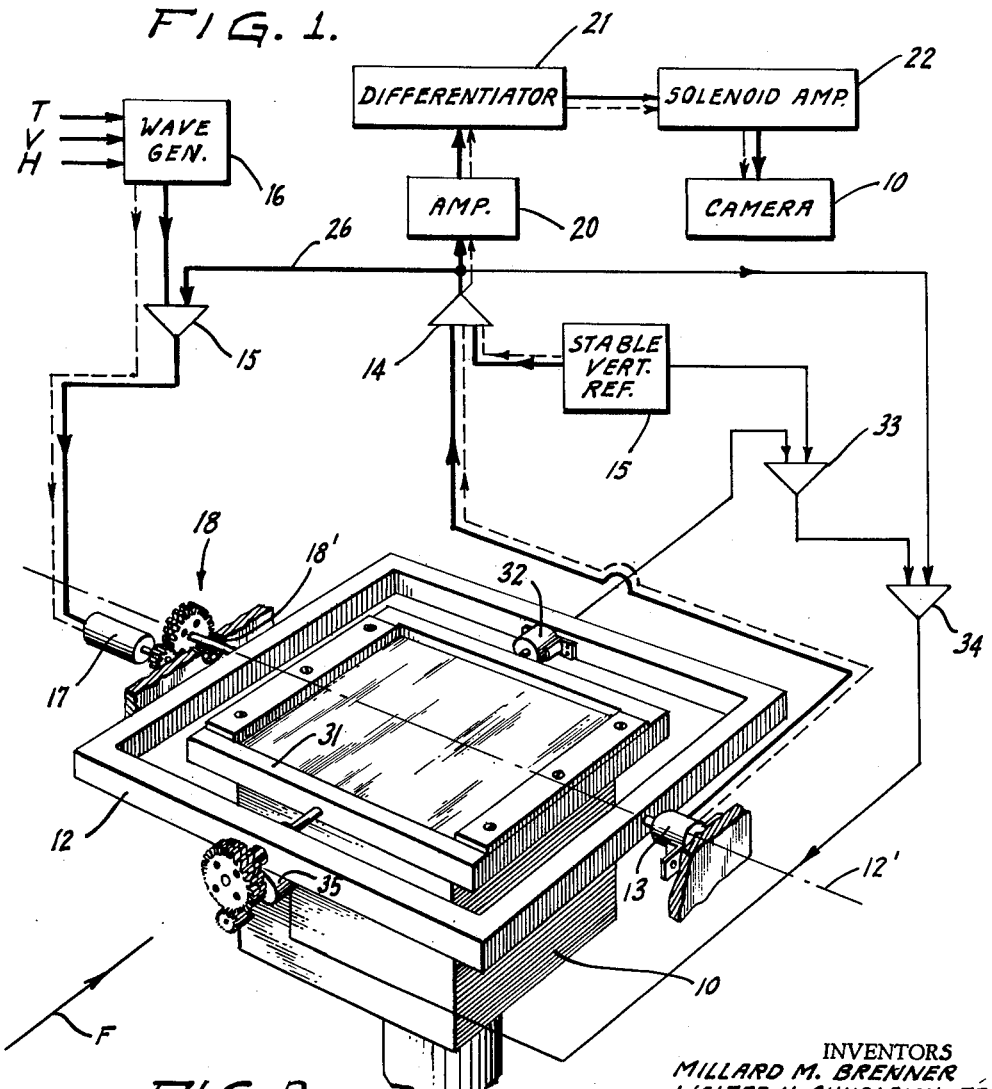

3,060,824
AERIAL PHOTOGRAPHING SYSTEM
Millard M. Brenner, Paoli, and Walter H. Chudleigh, Jr., Norristown, Pa., assignors, by mesne assignments, to Philco Corporation, Philadelphia, Pa., a corporation of Delaware
Filed Sept. 2, 1959, Ser. No. 837,738
22 Claims. (Cl. 95—12.5)

This invention relates generally to attitude control mechanism and more particularly to the photogrammetric art and to a unique method of and means for improving the acuity of intermittent aerial photography.

The essential criteria determinative of the acuity of present day aerial mapping systems are the degree to which true verticality is attained, despite the erratic motions of the aircraft, and the extent to which relative motion between camera and object is eliminated at the instant of film exposure.

The most sophisticated of prior art techniques for accomplishing high resolution and verticality generally employ some type of servo stabilizing mechanism for neutralizing the vagrant and unpredictable motions impressed on the camera through movements of the aircraft. The most refined of these systems, however, as for example those employing gyroscopic control, claim to approach true verticality at best only within a few minutes of arc. Factors underlying the inability to attain true verticality are the inherent limitation of present day servos to adequately respond to high frequency movement and the further characterizing feature that conventional servo feedback systems become operationally unstable as attempts are made to increase their sensitivity beyond a certain threshold of response.

The attainment of improved verticality has important commercial ramifications in that as true verticality is approached there is an attendant reduction in the complexity of ground-control and picture processing requirements. Even relatively minor deviations from true verticality are significant in applications such as map making and land use studies, the effect being most objectionable where elevational data is to be determined from the aerial photograph. As the departure from true verticality increases, the complexity and expense of stereoscopic plotting instruments and techniques similarly increases. Even planimetric maps of flat terrain cannot be traced directly from aerial photographs without making some adjustment for the effect of tilt.

Accordingly it is an object of the present invention to provide a method and means for taking aerial photographs which eliminates the shortcomings of prior art devices and which provides increased accuracy of optical axis orientation.

Another object of this invention is to provide a unique system for compensating for the relative velocity between aircraft and ground thereby to improve photographic acuity.

It is a still further object of this invention to provide an attitude control system for use in taking aerial photographs which insures the concurrence of object immobilization and verticality thereby to provide a mapping system of greatly improved accuracy.

Another and more particularized object of the invention is to provide a novel method of determining verticality which avoids the inherent limitations of conventional servo feedback systems and permits the practical attainment of absolute verticality coincidently with precise ground-speed compensation.

These and other objects within contemplation will be apparent by reference to the accompanying detailed description and drawings, in which:

FIGURE 1 is a diagrammatic view of a plane utilizing an attitude control system embodying the present invention;

FIGURE 2 is a time graph depicting the component movements of the camera mount; and FIGURE 3 shows one type of control system adapted for use with a gimbal caged camera.

In order to insure that the axis of an aerial camera is vertical at the instant the photograph is taken, it is sufficient to insure that the plane's tilt, as reflected in the position of the camera mount, is zero in both longitudinal and lateral axes. In contradistinction to conventional methods which rely solely on mount stabilization, this invention insures true verticality by impressing on the erratic aircraft-induced movements of the camera a sinusoidal oscillation of predetermined amplitude and frequency, a technique herein termed "dithering." This method forces the camera platform through true verticality at substantially regularly recurring intervals. The crossover points or points of zero error (hence zero tilt) are then sensed electronically to actuate the camera photographically insuring film exposure at the instant of true verticality. By this novel expedient the highly critical problem of mount stabilization is transformed, where a series of overlapping exposures are to be made, into the less sensitive problem of establishing an acceptable modulating frequency to determine the desired degree of film overlap. This parameter can undergo considerable variation without in the least affecting mapping acuity. By simply adjusting the frequency of the impressed sinusoidal wave motion, or dither, the number of exposures per second can be easily regulated to provide the required degree of film overlap.

One level of the present invention resides in applying this novel method of control to insure verticality of an object effected by movement in merely one plane of motion. The invention will first be described in relation to this simplified use after which its application to more complex movements will be described.

The system necessary to effect the above degree of control over a gimbal mounted aerial camera is shown connected by heavy lines in FIGURE 3.

The camera 10 is gimbal mounted in both the pitch and roll axes of the aircraft 11, in order that the camera may be individually manipulated in both these planes of reference, only pitch control however will be initially discussed. Conventionally the mount is stabilized by comparing its position with a stable reference point, a signal being generated to indicate the mount's displacement from the desired position. This error signal is then amplified and used to apply torque to the mount in such manner that the mount's output motions are caused to be equal and opposite to this measured discrepancy in order to neutralize any unbalanced condition. Our invention in its preferred form consists of superimposing on this basic type of stabilizing system a predetermined oscillation of the type and in the manner detailed below. During flight the position of the pitch gimbal 12 is sensed by a synchro 13 which transduces the platform's position or motion into an electrical signal. This electrical signal is injected into a differential amplifier 14 where it is compared with a reference signal generated by vertical detection means 15. Any one of a plurality of well recognized techniques for obtaining a vertical reference may be employed, as for example, a vertical gyro, or a vertical reference of the Schuler pendulum type insensitive to aircraft accelerations. As the art develops, the most refined vertical reference available may be readily incorporated into this inventive system in order to optimize sensitivity.

Any departure of the position of gimbal 12 from true verticality is reflected in the output of the differential amplifier 14. This error signal is then fed into another differential amplifier 15 along with a sinusoidal oscillation of predetermined amplitude and frequency produced by wave generator 16. The generated wave form is graphically shown as sine wave 19 in FIGURE 2 and is superimposed on the erratic servo controlled movements 25 of gimbal 12 to produce the composite wave form 23. The factors determinative of this sinusoidal wave form are discussed in detail below.

The output from amplifier 15, electrically represented by wave form 23, drives the pitch servo motor 17 which through an anti-backlash gear coupling 18 controls movement of the pitch gimbal 12. To reduce drag the gimbals are journalled in frictionless ball bearings 18' only one of which is shown. Torque may of course be transmitted by any of a number of conventional techniques and in applications where it is desirable to eliminate gearing between gimbal and frame electro-magnetic coupling may be employed. The coupling is so designed that negligible reaction torque occurs in the frame when the gimbal moves in space. To provide a static and dynamically balanced system the system is desirably designed to achieve coincidence of the system's C.G. with the axes of rotation thereby to reduce unbalanced torque. The rotational axis 12' of the pitch gimbal as shown in FIGURE 3, is transverse the direction of flight schematically indicated by arrow F, and permits compensating movements to be imparted to the camera in this plane of motion in order to offset gross attitude variations of the aircraft.

The output from differential amplifier 14 namely the displacement of the camera from true pitch verticality is continuously monitored by a cascade of limiting and clipping amplifiers 20 followed by a peaker or differentiator 21. The cross over point or position of true verticality is translated by this circuitry into a trigger pulse which is used to operate a solenoid amplifier 22 which in turn actuates the shutter mechanism of camera 10. In instances where the energy of the trigger pulse is insufficient for the purpose intended, the pulse may first be fed through a monostable multivibrator, not shown.

The oscillation 19 which is preferably of sinusoidal configuration but which may be of varied wave form depending on particular conditions in addition to insuring that the camera assumes a vertical posture at substantially regularly recurring intervals, can also be used to eliminate or reduce image blurring produced by the relative motion of aircraft and object.

To produce object immobilization at the instant of film exposure, the angular velocity of the camera's optical axis must be equal and opposite to the ground speed of the aircraft. This can be accomplished by controlling the amplitude of the generated wave which factor is determinative of the camera's speed of movement. By making the camera traversing speed proportional to the ratio of the plane's ground speed to its attitude H, object immobilization can be effected.

Accordingly in the preferred practice the wave generator 16 is caused to produce a sinusoidal wave 19 whose amplitude is determined by this ratio and whose frequency in this particular instance is dictated by the desired photo interval T. Electrical analogues of the plane's speed V and attitude H are continuously fed into the wave generator or computer 16 throughout the filming run to permit optimum control to be exercised over the camera's movements at the precise instant of film exposure.

Referring to FIGURE 2, it will be observed that the shutter is operated only at alternate crossover points 30 at a time when the camera is moving in the proper direction to compensate for the aircraft's ground speed. The speed of traverse is determined by the slope of the wave at the cross over point which factor is readily controlled by the amplitude of the generated wave form, the electrical wave being translated into mechanical motion through the intermediation of servo motor 17 in the manner described.

By this expedient the optical axis of the camera remains trained upon a given object on the ground during its front to back swing as graphically indicated in FIGURE 1.

The invention when utilized simply to provide attitude control in the pitch plane accomplishes a two fold purpose, that of insuring pitch verticality at the instant of exposure and the canceling of any effects resulting from relative motion between object and aircraft. Even presupposing movement in other planes of reference this minimal control can result in considerable improvement over present day aerial photographing systems.

In summary it will be noted that in accomplishment of these ends the control system is freed from reliance on the limited performance characteristics of a conventional servo system. By applying a forced sinusoidal variation to the servo controlled movements of the camera, the servo mechanism as such is used merely to correct for gross attitude variations of the aircraft thereby insuring that the dithering motion 19 is more or less symmetrically disposed about an average horizontal reference position. The technique of superimposing a forced oscillation on the servo-controlled movements of the camera makes the attainment of verticality independent of the sensitivity of the servo mechanism and insures the attainment of precise verticality.

It should be emphasized at this point that the invention fundamentally consists of applying a predetermined oscillation to an object such as an aerial camera whose vagrant and unpredictable movements are of an amplitude substantially less than that of the superimposed wave thereby permitting the object to be forced through a position of verticality at substantially periodic intervals whether or not that object is initially servo-stabilized. The cross over position is then sensed electronically to actuate, in the illustrated embodiment, the shutter mechanism of camera 10. Conversely stated, the amplitude of the forced oscillation must be substantially greater than the uncontrollable oscillations of the object being modulated in order to effect the desired end result mentioned above. Whether this condition is brought about in part by reason of the use of a servo controlled system which suppresses vagrant motion, as in the illustrated example, or is inherent in the movement of the object being controlled is immaterial. What constitutes a wave of sufficient amplitude will of course be determined by the particular application under consideration.

The apparatus necessary to effect control using an open loop or non-servoed system is shown connected by dashed lines in FIGURE 3, the amplifier 15 and connecting line 26 being deleted from the circuit. The operation of such an embodiment consists simply of imparting an oscillation of predetermined frequency and amplitude to the camera mechanism 10 via the wave generator 16 and servo motor 17 and then electronically detecting camera verticality in the manner already discussed in order to actuate the camera's shutter mechanism.

In applications requiring control to be exercised concurrently over an object moving in more than one plane of reference such as in controlling movement of an aerial camera about both pitch and roll axes, the entire system shown connected in solid lines in FIGURE 3 is employed.

The roll stabilizing loop functions in a manner similar to the pitch control system already described. The position of the roll gimbal 31 is monitored by synchro 32, the electrical transduction of which is applied to the roll error detector 33 where it is compared with the signal coming from the stable vertical reference 15. Any departure from verticality in the roll plane is then applied to a second differential amplifier 34. The other input to amplifier 34 consist of the pitch error signal derived from amplifier 14. By this method the deviations from true verticality in both roll and pitch planes are compared and their difference applied to the roll servo motor 35. This motor converts the output of amplifier 34 into mechanical motion and slaves the roll gimbal to the movements dictated by the pitch control loop forcing the two movements into synchronism. It may be seen that if the roll axis servo-loop has the high performance of an instrument servo the roll axis error will be forced to zero at the same instant that the pitch error passes through zero.

The output of differential amplifier 14 is monitored in the same manner previously described. When the camera platform assumes verticality the output of the pitch error detector will indicate zero error which signal is used to actuate the camera shutter mechanism through the pulsing circuitry shown.

If it were discovered under given conditions that the roll servo produced too great an error as a result of unavoidable lag, a lead network can be inserted in the input line of the differential amplifier 34 so as to produce exact coincidence of roll and pitch verticality.

The novelty of this dual control system briefly stated consists of using a modulated signal from one servo loop to provide a dither signal for a second servo in which movements in the second loop are forced into synchronism with the modulated movements in the first loop.

The servo system illustrated is an elementary type known as a position control servo. By the straightforward applicaiton of known servo design techniques, rate and/or acceleration compensatoin may be provided in either a single or plural axis embodiment. With a rate control servo, it would be feasible to automatically servo the rate to compensate for changes in altitude or velocity for puposes of image immobilization along either or both axes.

In the case of aircraft crabing, it is obvious that object immobilization would require coordinated motion compensation about both roll and pitch axes.

Although the invention has been described with particular reference to specific practice and embodiments, it will be understood by those skilled in the art that the apparatus of the invention may be changed and modified without departing from the essential scope of the invention as defined in the appended claims.

We claim:

1. The method of taking aerial photographs, which comprises: mounting an aerial camera with freedom for movement independently of the transporting aircraft; superimposing on the erratic aircraft-induced movements of said camera a predetermined cyclic motion having an amplitude sufficient to override said movements and to force said camera through a predetermined position at substantially regularly recurring intervals; generating a signal in response to passage of said camera through said predetermined position; and utilizing said signal to actuate said camera photographically.

2. The method of taking aerial photographs, which comprises: mounting an aerial camera with freedom for movement independently of the transporting aircraft; superimposing on the erratic aircraft-induced movements of said camera a predetermined cyclic oscillation having an amplitude sufficient to override said movements and to force said camera through a predetermined position of verticality at substantially regularly recurring intervals; generating a signal in response to the passage of said camera through verticality; and utilizing said signal to actuate said camera photographically.

3. The method of taking aerial photographs, which comprises: mounting an aerial camera with freedom for movement independently of the transporting aircraft; superimposing on the erratic aircraft-induced movements of said camera a predetermined cyclically repetitive oscillation having an amplitude sufficient to override said movements and to force said camera through a position of verticality at substantially periodic intervals; generating an electrical signal in response to the passage of said camera through verticality; and utilizing said signal to actuate said camera photographically.

4. An aerial photographing method, which comprises: mounting a camera with freedom for movement independently of the transporting aircraft; servo-stabilizing the movements of said camera; superimposing on the servo-controlled movements of said camera a cyclically repetitive, a predetermined sinusoidal oscillation of an amplitude sufficient to override the servo-damped movements of said camera and to force said camera throughout a position of verticality at substantially regularly recurring intervals; providing electrical indication of camera verticality; and utilizing said indication to actuate said camera photographically.

5. The method of aerial mapping, which comprises: mounting a camera with freedom for movement independently of the transporting aircraft; superimposing on the erratic aircraft-induced movements of said camera a predetermined cyclically repetitive oscillation; controlling the amplitude of said superimposed oscillation to both force said camera through a position of verticality at substantially periodic intervals and to provide a camera traversing speed effecting object immobilization; providing electrical indication of camera verticality; and utilizing said indication to actuate said camera photographically.

6. The method of aerial mapping, which comprises: mounting a camera with freedom for movement independently of the transporting aircraft; superimposing on the erratic aircraft-induced movements of said camera a cyclically repetitive predetermined oscillation; controlling the amplitude of said superimposed oscillation to both force said camera through a position of verticality at substantially periodic intervals and to provide a camera traversing speed effecting object immobilization; regulating said superimposed oscillatory frequency to provide a desired degree of overlap between successive exposures; providing electrical indication of camera verticality; and utilizing said indication to actuate said camera photographically.

7. The method of aerial mapping, which comprises: mounting an air-borne camera with freedom for movement independently of the transporting aircraft; servo-stabilizing the movements of said camera; superimposing on the servo-controlled movements of said camera a predetermined cyclically repetitive oscillation; controlling the amplitude of said superimposed oscillation to both force said camera through a position of verticality at substantially periodic intervals and to provide a camera traversing speed effecting object immobilization; providing electrical indication of camera verticality; and utilizing said indication to actuate said camera photographically.

8. The method of aerial mapping, which comprises: mounting an air-borne camera with freedom for movement independently of the transporting aircraft; servo-stabilizing the movements of said camera; superimposing on the servo-controlled movements of said camera a predetermined cyclically repetitive oscillation; controlling the amplitude of said superimposed oscillation to both force said camera through a position of verticality at substantially periodic intervals and to provide a camera traversing speed effecting object immobilization; regulating said oscillatory frequency to provide a desired degree of overlap between successive exposures; providing electrical indication of camera verticality; and utilizing said indication to actuate said camera photographically.

9. An aerial photographing method, which comprises: mounting a camera for movement about mutually perpendicular axes independently of the transporting aircraft; servo-stabilizing the movements of said camera about each of said axes; superimposing on the servo-controlled movements of said camera about one of said axes a predetermined cyclically repetitive oscillation of an amplitude sufficiently greater than that of the servo-damped movements of said camera to produce a composite motion forcing said camera through a position of verticality at substantially regularly recurring intervals; servo-slaving the movements of said camera about the other of said axes to the composite modulated movements of said camera about said one of said axes; and sensing camera verticality to actuate said camera photographically.

10. The method of taking intermittent aerial photographs, which comprises: mounting an aerial camera for movement about mutually perpendicular axes independently of the transporting aircraft; servo-stabilizing the movements of said camera about each of said axes; superimposing on the servo-controlled movements of the camera about one of said axes a predetermined cyclically repetitive sinusoidal oscillation; controlling the amplitude of said oscillation both to produce a composite motion forcing said camera through verticality at substantially regularly recurring intervals, and to provide a camera traversing speed capable of effecting object immobilization; regulating the frequency of said superimposed oscillation to provide a desired degree of overlap between successive photographic exposures; servo-slaving the movements of said camera about the other of said axes to the composite modulated movements of the camera about said one of said axes, electronically sensing camera verticality; and actuating said camera photographically in response thereto.

11. The method of taking aerial photographs which comprises: mounting the aerial camera for movement about mutually perpendicular axes independently of the transporting aircraft; servo-stabilizing the movements of said camera about one of said axes; superimposing on the movements of said camera about the other of said axes a predetermined cyclically repetitive sinusoidal oscillation having an amplitude sufficiently greater than the aircraft-induced movements of the camera to force said camera through positions of verticality at substantially regularly recurring intervals; superimposing on the servo-damped movements of said camera the modulated motion of said camera about said other of said axes so as to bring the movements of said camera about each of said axes into synchronism; electronically sensing camera verticality; and actuating said camera photographically in response thereto.

12. The method of taking aerial photographs, which comprises: mounting a camera for movement about mutually perpendicular axes independently of the transporting aircraft; servo-stabilizing the movement of said camera about each of said axes; superposing a predetermined cyclically repetitive sinusoidal oscillation on the movements of said camera about one of said axes; controlling the waveform of said superimposed oscillation both to force said camera through verticality at substantially regularly recurring intervals and to provide a camera traversing speed effecting object immobilization; servo-controlling the movements of said camera about the other of said axes to bring the movements of said camera about each of said axes into synchronism; electronically sensing the passage of said camera through verticality; and actuating said camera photographically in response thereto.

13. An aerial photographing system, comprising: a camera; means mounting said camera for movement independently of a transporting aircraft; means for impressing on said camera a cyclically repetitive oscillation of an amplitude sufficiently greater than the erratic aircraft-induced movements of said camera to force said camera through a predetermined position at substantially regularly recurring intervals; and means for sensing the passage of said camera through said predetermined position to actuate said camera photographically.

14. In an aerial photographing system, the combination comprising: a camera; means mounting said camera for movement about mutually perpendicular axes independently of the transporting aircraft; means for imparting cyclically repetitive oscillatory movement to said camera of an amplitude sufficient to force said camera through a position of verticality at substantially regularly recurring intervals; and means for electrically sensing the passage of said camera through a position of verticality to actuate said camera photographically.

15. In an aerial photographing system, the combination comprising: a camera; gimbal means mounting said camera for movement about mutually perpendicular axes independently of the transporting aircraft; means for cyclically sinusoidally oscillating said gimbal about each of said axes through an excursion sufficient to override the erratic aircraft-induced movements of said camera to force said camera through a position of verticality at substantially regularly recurring intervals; and means for sensing the passage of said camera through a position of verticality to actuate said camera photographically.

16. In an aerial photographing system, the combination comprising: a camera; gimbal means mounting said camera for movement independently of the transporting aircraft; means for cyclically oscillating said gimbal means through an excursion sufficient to override the erratic aircraft-induced movements of said camera to force said camera through a position of verticality at substantially regularly recurring intervals; and electronic means for actuating said camera in response to the passage of said camera through a position of verticality.

17. An aerial photographing system comprising: a camera; means mounting said camera for oscillatory movement independently of the transporting aircraft; means for imparting a cyclically repetitive predetermined oscillation to said camera to override the erratic aircraft-induced movements of said camera both to force said camera through a position of verticality at substantially periodic intervals, and to provide a camera traversing speed effecting object immobilization; and electronic means for actuating said camera in response to the passage of said camera through a position of verticality.

18. An aerial photographing system, comprising: a camera; means mounting said camera for movement about mutually perpendicular axes independently of the transporting aircraft; means for superimposing on said camera a predetermined cyclically repetitive sinusoidal oscillation about one of said axes of an amplitude sufficiently greater than the erratic, aircraft-induced movements of said camera to force said camera through a position of verticality at substantially periodic intervals; means for translating the instantaneous position of said camera about said one of said axes into an electrical analogue; means providing a vertical index; means for electronically monitoring said analogue and index continuously to indicate the position of said camera relative to the vertical; a servo-controlled system for stabilizing the movement of said camera about the other of said axes; means for slaving said servo to the monitored movements of said camera about said one of said axes to bring said camera's movements about each of said axes into synchronism; and electronic means for actuating said camera in response to the passage of said camera through a position of verticality.

19. In an aerial photographing system, the combination comprising: a camera; gimbal means mounting said camera for movement about mutually perpendicular axes independently of the transporting aircraft; electro-mechanical means for super-imposing on said camera a predetermined cyclically repetitive sinusoidal oscillation of an amplitude sufficiently greater than the erratic, aircraft-induced movements of said camera to force said camera through a position of verticality at substantially regularly recurring intervals; means for regulating the wave form of said oscillation to provide a camera traversing speed producing object immobilization; means for translating the instantaneous position of said camera about one of said axes into an electrical analogue; means providing an electrical index of verticality; means for electronically monitoring said analogue and index to generate a signal indicative of said camera's position relative to the vertical; a servo-control system for stabilizing the movement of said camera about the other of said axes; means for slaving the servo-controlled movements of said camera to the monitored movements of said camera represented by said signal; and electronic means for actuating said camera in response to the passage of said camera through a position of verticality.

20. In an aerial photographing system, the combination comprising: a camera; gimbal means mounting said camera for movement about mutually perpendicular axes independently of the transporting aircraft; servo means for stabilizing the movements of said camera about each of said axes; means for superimposing on the servo-controlled movements of said camera about one of said axes a predetermined cyclically repetitive sinusoidal oscillation of an amplitude sufficient to force said camera through a position of verticality at substantially regularly recurring intervals; means for translating the instantaneous position of said camera about said one of said axes into an electrical analogue; means providing an electrical index of verticality; means for electronically monitoring said analogue and index and for generating a signal representative of said camera's position relative to the vertical; means utilizing said signal to bring the servo-controlled movements of said camera about each of said axes into synchronism; and electronic means for actuating said camera in response to said camera's passage through a position of verticality.

21. The method of aerial mapping, which comprises: mounting a camera with freedom for movement independently of the transporting aircraft; super-imposing on the erratic aircraft-induced movements of said camera a predetermined, cyclically repetitive oscillation; regulating the amplitude of said superimposed oscillation to force said camera through a position of verticality at substantially periodic intervals; further regulating the amplitude and/or frequency of said oscillation to provide a camera traversing speed effecting object immobilization; providing electronic indication of camera verticality; and utilizing said indication to actuate said camera photographically.

22. An aerial photographing system comprising: a camera; means mounting said camera for movement independently of the transporting aircraft; means for imparting a cyclically repetitive, predetermined oscillation to said camera of an amplitude and frequency sufficinet to override the erratic aircraft-induced movements of said camera both to force said camera through a position of verticality at predetermined periodic intervals, and to provide a camera traversing speed effecting object immobilization; and electronic means for actuating said camera in response to the passage of said camera through positions of verticality.

References Cited in the file of this patent
UNITED STATES PATENTS

| | | |
|---|---|---|
| 1,829,142 | Hyden | Oct. 27, 1931 |
| 1,880,960 | Keale | Oct. 4, 1932 |
| 2,507,459 | Sanduik et al. | May 9, 1950 |
| 2,523,267 | Aschenbrenner et al. | Sept. 26, 1950 |
| 2,899,882 | Wylie et al. | Aug. 18, 1959 |
| 2,961,877 | Edwards | Nov. 29, 1960 |
| 2,967,470 | Willits et al. | Jan. 10, 1961 |